United States Patent
Zhang et al.

(10) Patent No.: US 11,320,839 B2
(45) Date of Patent: May 3, 2022

(54) INTEGRATED METHOD AND SYSTEM FOR COMMUNICATION, POSITIONING, NAVIGATION, AND TIMING OF DEEP-SEA VEHICLE

(71) Applicant: National Deep Sea Center, Shandong (CN)

(72) Inventors: Tongwei Zhang, Shandong (CN); Shengjie Qin, Shandong (CN); Xiangxin Wang, Shandong (CN); Jialing Tang, Shandong (CN); Dequan Lu, Shandong (CN); Zhengguang Li, Shandong (CN)

(73) Assignee: National Deep Sea Center, Shandong (CN)

( * ) Notice: Subject to any disclaimer, the term of this patent is extended or adjusted under 35 U.S.C. 154(b) by 537 days.

(21) Appl. No.: 16/527,229

(22) Filed: Jul. 31, 2019

(65) Prior Publication Data
US 2020/0042020 A1  Feb. 6, 2020

(30) Foreign Application Priority Data
Aug. 3, 2018 (CN) .......................... 201810877550.X

(51) Int. Cl.
*G05D 1/06* (2006.01)
*G05D 1/04* (2006.01)
(Continued)

(52) U.S. Cl.
CPC .......... *G05D 1/0692* (2013.01); *B63G 8/001* (2013.01); *B63G 8/14* (2013.01); *G01V 7/16* (2013.01);
(Continued)

(58) Field of Classification Search
CPC .............. B63B 79/40; B63B 2008/004; B63B 2008/005; B63B 8/001; B63B 8/14;
(Continued)

(56) References Cited

U.S. PATENT DOCUMENTS

| | | | | | |
|---|---|---|---|---|---|
| 5,589,741 | A | * | 12/1996 | Terman | H05B 47/11 315/159 |
| 5,812,494 | A | * | 9/1998 | Medeiros | G01S 7/526 367/103 |

(Continued)

FOREIGN PATENT DOCUMENTS

| | | |
|---|---|---|
| CN | 1547039 A | 11/2004 |
| CN | 101833081 A | 9/2010 |

(Continued)

OTHER PUBLICATIONS

Chinese Office Action dated May 5, 2019; Chinese Application No. 2018108877550.X; Filing Date: Aug. 3, 2018; 1 page.

(Continued)

*Primary Examiner* — Tyler J Lee
(74) *Attorney, Agent, or Firm* — Blank Rome LLP

(57) ABSTRACT

An integrated method and system for communication, positioning, navigation, and timing of a deep-sea vehicle. The method implements integration and deep fusion of communication, positioning, navigation, and timing, and can achieve uniformity of space references and time references between sensors and systems, can reduce difficulty in information fusion, and can implement convenient underwater acoustic communication, real-time/high-update-rate/low-power-consumption/high-precision positioning, high-precision/fault-tolerant navigation, and precise timing. The present invention implements simultaneous operation of four working modes: communication, positioning, navigation, and timing, to fundamentally resolve problems such as insufficient practicability of underwater acoustic communi- (Continued)

cation, low accuracy of navigation and positioning, and no timing function, so as to improve underwater operation efficiency of a deep-sea vehicle.

10 Claims, 4 Drawing Sheets

(51) Int. Cl.
  *B63G 8/00* (2006.01)
  *G05D 1/02* (2020.01)
  *G01V 7/16* (2006.01)
  *B63G 8/14* (2006.01)
(52) U.S. Cl.
  CPC .......... *G05D 1/0206* (2013.01); *G05D 1/048* (2013.01); *B63G 2008/004* (2013.01); *B63G 2008/005* (2013.01)
(58) Field of Classification Search
  CPC .............. G01C 21/005; G01C 21/1652; G01V 1/3835; G01V 7/16; G05D 1/0206; G05D 1/048; G05D 1/0692; H04L 67/30; H04W 4/025; H04W 4/027; H04W 4/40; Y02D 30/70
  See application file for complete search history.

(56) References Cited

U.S. PATENT DOCUMENTS

| | | | | |
|---|---|---|---|---|
| 6,683,820 | B1* | 1/2004 | Struzinski | G01S 15/66 367/131 |
| 10,081,416 | B2* | 9/2018 | Elder | B63G 8/001 |
| 10,305,677 | B2* | 5/2019 | Udovydchenkov | H04L 25/0212 |
| 11,214,343 | B2* | 1/2022 | Holloway | G01V 1/3852 |
| 2011/0096630 | A1* | 4/2011 | Park | G01S 7/52004 367/99 |
| 2016/0091625 | A1* | 3/2016 | Ikegami | G01V 1/40 367/27 |
| 2016/0202380 | A1* | 7/2016 | Olivier | G01V 1/3808 367/15 |
| 2016/0266247 | A1* | 9/2016 | Hjelmstad | G01S 13/865 |
| 2018/0127073 | A1 | 5/2018 | Elder | |
| 2019/0007195 | A1* | 1/2019 | Udovydchenkov | H04L 25/0212 |

FOREIGN PATENT DOCUMENTS

| | | |
|---|---|---|
| CN | 102829777 A | 12/2012 |
| CN | 103823229 A | 5/2014 |
| CN | 106027188 A | 10/2016 |

OTHER PUBLICATIONS

English translation of Chinese Office Action dated May 5, 2019; Chinese Application No. 2018108877550.X; Filing Date: Aug. 3, 2018; 2 pages.
English translation of Chinese Publication No. CN1547039A; Publication Date: Nov. 17, 2004; 13 pages.
English translation of Chinese Publication No. CN101833081; Publication Date: Sep. 15, 2010; 7 pages.
English translation of Chinese Publication No. CN102829777; Publication Date: Dec. 19, 2012; 12 pages.
English translation of Chinese Publication No. CN 106027188; Publication Date: Oct. 12, 2016; 6 pages.
English translation of Chinese Publication No. CN 103823229; Publication Date: May 28, 2014; 9 pages.
Harbin Engineering University; 20140430 He Dongxu; "AUV underwater navigation system key technical research"; 135 pages. English Abstract attached.

* cited by examiner

INTEGRATED METHOD AND SYSTEM FOR COMMUNICATION, POSITIONING, NAVIGATION, AND TIMING OF DEEP-SEA VEHICLE

RELATED APPLICATION

This application claims benefit of priority of China Patent Application No. 201810877550.X, filed Aug. 3, 2018, entitled: INTEGRATED METHOD AND SYSTEM FOR COMMUNICATION, POSITIONING NAVIGATION, AND TIMING OF DEEP-SEA VEHICLE. The above-identified, related application is incorporated herein by reference in its entirety.

FIELD OF THE INVENTION

The present invention relates to the field of deep sea measurement, and in particular, to an integrated method and system for communication, positioning, navigation, and timing of a deep-sea vehicle.

BACKGROUND OF THE INVENTION

High-quality deep-sea communication, positioning, navigation, and timing is a key for entering, exploring, and developing a deep sea by using a large deep-sea vehicle such as a deep-sea space station, a deep-sea manned submersible, a deep-sea remotely operated vehicle, and a deep-sea autonomous vehicle. However, traditional maritime powers such as Europe, America, Japan, and Russia, or emerging maritime powers such as China, Korea, and India use, all use, without exception, a communications system, a positioning system, a navigation system, and a synchronous clock (atomic clock) separated from each other, to provide communication, positioning, navigation, and a time service for a deep-sea vehicle. The independence of all systems directly leads to non-uniformity of space references and time references of all the separate systems, increases difficulty in information fusion, and reduces precision of navigation and positioning. A scientific research ship locates a deep-sea vehicle, and then sends a positioning result to the deep-sea vehicle through underwater acoustic communication. As a result, when the deep-sea vehicle obtains its own position information, an update rate is low, and a delay is large. There is an inherent defect in a conventional communication, positioning, and navigation system and an operating mode thereof, which directly affects operation efficiency of a deep-sea vehicle in deep-sea scientific research, environmental survey, and resource development.

In recent years, with rapid development of deep-sea high and new technology equipment, demands for convenient underwater acoustic communication, real-time/high-update-rate/low-power-consumption/high-precision positioning, high-precision/fault-tolerant navigation, and precise timing are becoming more urgent and extensive.

SUMMARY OF THE INVENTION

An objective of the present invention is to provide an integrated method and system for communication, positioning, navigation, and timing of a deep-sea vehicle, to fundamentally resolve problems such as insufficient practicability of underwater acoustic communication, low accuracy of navigation and positioning, and no timing function, so as to improve underwater operation efficiency of a deep-sea vehicle.

To achieve the above objective, the present invention provides the following technical solution.

An integrated method for communication, positioning, navigation, and timing of a deep-sea vehicle is provided, where the integrated method is applied to an integrated device for communication, positioning, navigation, and timing of a deep-sea vehicle, the integrated device includes a water surface monitoring platform, a deep-sea vehicle, and a scientific research ship/shore-based monitoring center; and the integrated method includes:

acquiring latitude and longitude and time information of the water surface monitoring platform;

delivering the latitude and longitude and time information of the water surface monitoring platform to the deep-sea vehicle in an underwater acoustic communication manner;

decoding the communication information by the deep-sea vehicle, to acquire the latitude and longitude and a time when the water surface monitoring platform transmits the communication information;

acquiring a time when the deep-sea vehicle receives the communication information;

obtaining a transmission delay according to the time when the water surface monitoring platform transmits the communication information and the time when the deep-sea vehicle receives the communication information;

acquiring a sound velocity profile and a depth of the deep-sea vehicle;

constructing an eigenray according to the sound velocity profile, the depth of the deep-sea vehicle, and the transmission delay;

obtaining a horizontal distance between the water surface monitoring platform and the deep-sea vehicle according to the eigenray and the depth of the deep-sea vehicle;

acquiring a precise azimuth angle of the water surface monitoring platform relative to the deep-sea vehicle;

determining relative position information of the deep-sea vehicle relative to the water surface monitoring platform according to the transmission delay, the azimuth angle, and the depth of the deep-sea vehicle;

calculating absolute position information of the deep-sea vehicle according to the relative position information and the latitude and longitude information of the water surface monitoring platform;

acquiring inertial navigation information and Doppler log information of the deep-sea vehicle;

conducting fusion correction on the latitude and longitude information of the water surface monitoring platform, the horizontal distance, the absolute position information, the inertial navigation information, and the Doppler log information, to obtain integrated navigation information;

sending the integrated navigation information, status information, and the like of the deep-sea vehicle to the water surface monitoring platform of the deep-sea vehicle in an underwater acoustic communication manner;

decoding the communication information by the water surface monitoring platform of the deep-sea vehicle, to obtain the communication information transmitted by the deep-sea vehicle, and forwarding the communication information to the scientific research ship/shore-based monitoring center through a satellite;

transmitting timing sound pulse signals to each other simultaneously by the water surface monitoring platform and the deep-sea vehicle, and receiving the timing sound pulse signal sent by the other party;

measuring a time when the water surface monitoring platform transmits the timing sound pulse signal and a time when the water surface monitoring platform receives the timing sound pulse signal transmitted by the deep-sea vehicle, and recording a time difference between the two times as a first time interval;

measuring a time when the deep-sea vehicle transmits the timing sound pulse signal and a time when the deep-sea vehicle receives the timing sound pulse signal transmitted by the water surface monitoring platform, and recording a time difference between the two times as a second time interval;

calculating a time difference between the water surface monitoring platform and the deep-sea vehicle according to the first time interval and the second time interval; and conducting timing on a clock of the deep-sea vehicle according to the time difference.

Optionally, the obtaining a transmission delay according to the time when the water surface monitoring platform transmits the communication information and the time when the deep-sea vehicle receives the communication information specifically includes:

determining a transmission delay of an underwater acoustic communication signal according to the time when the water surface monitoring platform transmits the communication information obtained by decoding by the deep-sea vehicle and the time when the deep-sea vehicle receives the communication information.

Optionally, the obtaining a horizontal distance between the water surface monitoring platform and the deep-sea vehicle according to the eigenray and the depth of the deep-sea vehicle specifically includes:

constructing the eigenray according to the sound velocity profile, the depth of the deep-sea vehicle, and the transmission delay; and obtaining the horizontal distance between the water surface monitoring platform and the deep-sea vehicle according to the eigenray and the depth of the deep-sea vehicle by using the Pythagorean theorem.

Optionally, the acquiring a precise azimuth angle of the water surface monitoring platform relative to the deep-sea vehicle specifically includes:

preliminarily estimating the azimuth angle of the water surface monitoring platform relative to the deep-sea vehicle according to a track of the deep-sea vehicle and a track of the water surface monitoring platform in a preceding period of time;

determining the precise azimuth angle of the water surface monitoring platform relative to the deep-sea vehicle according to the communication signal received by the deep-sea vehicle and the azimuth angle.

Optionally, the determining relative position information of the deep-sea vehicle relative to the water surface monitoring platform according to the transmission delay, the azimuth angle, and the depth of the deep-sea vehicle specifically includes:

adopting a ray theory model, and using the azimuth angle and the transmission delay as an angle of emergence and transmission time of the eigenray respectively;

using depth information measured by a high-precision depth gauge in the deep-sea vehicle and a depth of an acoustic transducer of the water surface monitoring platform as an emergence depth and an end point depth of the eigenray respectively;

reconstructing an eigenray according to the angle of emergence, the transmission time, the emergence depth, and the end point depth of the eigenray; and solving the eigenray to obtain the position of the deep-sea vehicle relative to the water surface monitoring platform.

Optionally, the conducting fusion correction on the latitude and longitude information of the water surface monitoring platform, the horizontal distance, the absolute position information, the inertial navigation information, and the Doppler log information, to obtain integrated navigation information specifically includes:

conducting fusion correction on the latitude and longitude information, the horizontal distance, the absolute position information, the inertial navigation information, and the Doppler log information by using a Kalman filtering method, to obtain integrated navigation information.

Optionally, before conducting integrated navigation, the method further includes:

conducting determining on the horizontal distance information and the absolute position information according to the track of the deep-sea vehicle and the track of the water surface monitoring platform in the preceding period of time, to determine whether the horizontal distance information and the absolute position information are outlier information; and if yes, deleting the horizontal distance information and the absolute position information; or if no, correcting the horizontal distance information and the absolute position information to obtain the integrated navigation information.

Optionally, based on the sound-field reciprocal theory, an uplink acoustic signal and a downlink acoustic signal pass through a same path in a short time, and influence of homogeneity of media in an underwater acoustic channel cancels each other, and the calculating a time difference between the water surface monitoring platform and the deep-sea vehicle according to the first time interval and the second time interval specifically includes:

calculating the time difference $\Delta t$ between the water surface monitoring platform and the deep-sea vehicle according to the following formula $\Delta t=(\Delta t_1-\Delta t_2)/2$ wherein $\Delta t_1$ is the first time interval, $\Delta t_2$ is the second time interval, and $\Delta t$ is the time difference between the water surface monitoring platform and the deep-sea vehicle.

To achieve the above objective, the present invention further provides the following technical solution.

An integrated system for communication, positioning, navigation, and timing of a deep-sea vehicle is provided, wherein the system includes:

a first acquiring module, configured to acquire latitude and longitude and time information of a water surface monitoring platform;

a downward communication module, configured to deliver the latitude and longitude and time information of the water surface monitoring platform to a deep-sea vehicle in an underwater acoustic communication manner;

a decoding module, configured to decode the communication information by the deep-sea vehicle, to acquire the latitude and longitude and a time when the water surface monitoring platform transmits the communication information;

a second acquiring module, configured to acquire a time when the deep-sea vehicle receives the communication information;

a transmission delay determining module, configured to obtain a transmission delay according to the time when the water surface monitoring platform transmits the communication information and the time when the deep-sea vehicle receives the communication information;

a third acquiring module, configured to obtain acquire a sound velocity profile and a depth of the deep-sea vehicle;

an eigenray construction module, configured to construct an eigenray according to the sound velocity profile, the depth of the deep-sea vehicle, and the transmission delay;

a horizontal distance determining module, configured to obtain a horizontal distance between the water surface monitoring platform and the deep-sea vehicle according to the eigenray and the depth of the deep-sea vehicle;

a precise-azimuth-angle determining module, configured to acquire a precise azimuth angle of the water surface monitoring platform relative to the deep-sea vehicle;

a relative position information determining module, configured to determine relative position information of the deep-sea vehicle relative to the water surface monitoring platform according to the transmission delay, the azimuth angle, and the depth of the deep-sea vehicle;

a positioning module, configured to calculate absolute position information of the deep-sea vehicle according to the relative position information and the latitude and longitude information of the water surface monitoring platform;

a fourth acquiring module, configured to acquire inertial navigation information and Doppler log information of the deep-sea vehicle;

an integrated navigation module, configured to conduct fusion correction on the latitude and longitude information of the water surface monitoring platform, the horizontal distance, the absolute position information, the inertial navigation information, and the Doppler log information, to obtain integrated navigation information;

an upward communication module, configured to send the integrated navigation information, status information, and the like of the deep-sea vehicle to the water surface monitoring platform of the deep-sea vehicle in an underwater acoustic communication manner;

a decoding and forwarding module, configured to decode the communication information by the water surface monitoring platform of the deep-sea vehicle, to obtain the communication information transmitted by the deep-sea vehicle, and forward the communication information to a scientific research ship/shore-based monitoring center through a satellite;

a transmitting and receiving module, configured to transmit timing sound pulse signals to each other simultaneously by the water surface monitoring platform and the deep-sea vehicle, and receive the timing sound pulse signal sent by the other party;

a first-time-interval determining module, configured to measure a time when the water surface monitoring platform transmits the timing sound pulse signal and a time when the water surface monitoring platform receives the timing sound pulse signal transmitted by the deep-sea vehicle, and record a time difference between the two times as a first time interval;

a second-time-interval determining module, configured to measure a time when the deep-sea vehicle transmits the timing sound pulse signal and a time when the deep-sea vehicle receives the timing sound pulse signal transmitted by the water surface monitoring platform, and record a time difference between the two times as a second time interval;

a time difference determining module, configured to calculate a time difference between the water surface monitoring platform and the deep-sea vehicle according to the first time interval and the second time interval; and a timing module, configured to conduct timing on a clock of the deep-sea vehicle according to the time difference.

Optionally, the integrated navigation module specifically includes:

a fusion correction module, configured to conduct fusion correction on the latitude and longitude information, the horizontal distance, the absolute position information, the inertial navigation information, and the Doppler log information by using a Kalman filtering method, to obtain integrated navigation information.

According to specific embodiments provided in the present invention, the present invention discloses the following technical effects:

The present invention discloses an integrated method for communication, positioning, navigation, and timing of a deep-sea vehicle. The method in the present invention implements integration and deep fusion of communication, positioning, navigation, and timing, and can achieve uniformity of space references and time references between sensors and systems, can reduce difficulty in information fusion, and can implement convenient underwater acoustic communication, real-time/high-update-rate/low-power-consumption/high-precision positioning, high-precision/fault-tolerant navigation, and precise timing. Obviously, the present invention implements simultaneous operation of four working modes: communication, positioning, navigation, and timing, to fundamentally resolve problems such as insufficient practicability of underwater acoustic communication, low accuracy of navigation and positioning, and no timing function, so as to improve underwater operation efficiency of a deep-sea vehicle.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF THE ILLUSTRATED EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make objectives, features, and advantages of the present invention more comprehensible, the following describes the present invention in more detail with reference to accompanying drawings and specific implementations.

Figure 1:
FIG. 1 is a flowchart of an integrated method for communication, positioning, navigation, and timing of a deep-sea vehicle according to an embodiment of the present invention.

FIG. 1 is a flowchart of an integrated method for communication, positioning, navigation, and timing of a deep-sea vehicle according to an embodiment of the present invention. FIG. 1 shows an integrated method for communication positioning, navigation, and timing of a deep-sea vehicle is shown, where the integrated method is applied to an integrated device for communication positioning, navigation, and timing of a deep-sea vehicle, the integrated device includes a water surface monitoring platform, a deep-sea vehicle, and a scientific research ship/shore-based monitoring center; and the integrated method includes the following steps:

Step 101: Acquire latitude and longitude and time information of the water surface monitoring platform.

Step 102: Deliver the latitude and longitude and time information of the water surface monitoring platform to the deep-sea vehicle in an underwater acoustic communication manner.

Step 103: Decode the communication information by the deep-sea vehicle, to acquire the latitude and longitude and a time when the water surface monitoring platform transmits the communication information.

Step 104: Acquire a time when the deep-sea vehicle receives the communication information.

Step 105: Obtain a transmission delay according to the time when the water surface monitoring platform transmits the communication information and the time when the deep-sea vehicle receives the communication information.

Step 106: Acquire a sound velocity profile and a depth of the deep-sea vehicle.

Step 107: Construct an eigenray according to the sound velocity profile, the depth of the deep-sea vehicle, and the transmission delay.

Step 108: Obtain a horizontal distance between the water surface monitoring platform and the deep-sea vehicle according to the eigenray and the depth of the deep-sea vehicle.

Step 109: Acquire a precise azimuth angle of the water surface monitoring platform relative to the deep-sea vehicle.

Step 110: Determine relative position information of the deep-sea vehicle relative to the water surface monitoring platform according to the transmission delay, the azimuth angle, and the depth of the deep-sea vehicle.

Step 111: Calculate absolute position information of the deep-sea vehicle according to the relative position information and the latitude and longitude information of the water surface monitoring platform.

Step 112: Acquire inertial navigation information and Doppler log information of the deep-sea vehicle.

Step 113: Conduct fusion correction on the latitude and longitude information of the water surface monitoring platform, the horizontal distance, the absolute position information, the inertial navigation information, and the Doppler log information, to obtain integrated navigation information.

Step 114: Send the integrated navigation information, status information, and the like of the deep-sea vehicle to the water surface monitoring platform of the deep-sea vehicle (once every 20 minutes) in an underwater acoustic communication manner.

Step 115: Decode the communication information by the water surface monitoring platform of the deep-sea vehicle, to obtain the communication information transmitted by the deep-sea vehicle, and forward the communication information to the scientific research ship/shore-based monitoring center through a satellite.

Step 116: Transmit timing sound pulse signals to each other simultaneously (based on respective clocks) by the water surface monitoring platform and the deep-sea vehicle, and receive the timing sound pulse signal sent by the other party (at an interval of several hours).

Step 117: Measure a time when the water surface monitoring platform transmits the timing sound pulse signal and a time when the water surface monitoring platform receives the timing sound pulse signal transmitted by the deep-sea vehicle, and record a time difference between the two times as a first time interval.

Step 118: Measure a time when the deep-sea vehicle transmits the timing sound pulse signal and a time when the deep-sea vehicle receives the timing sound pulse signal transmitted by the water surface monitoring platform, and record a time difference between the two times as a second time interval.

Step 119: Calculate a time difference between the water surface monitoring platform and the deep-sea vehicle according to the first time interval and the second time interval.

Step 120: Conduct timing on a clock of the deep-sea vehicle according to the time difference.

Step 105 specifically includes:

determining a transmission delay of an underwater acoustic communication signal according to the time when the water surface monitoring platform transmits the communication information obtained by decoding by the deep-sea vehicle and the time when the deep-sea vehicle receives the communication information.

Step 108 specifically includes:

constructing the eigenray according to the sound velocity profile, the depth of the deep-sea vehicle, and the transmission delay; and obtaining the horizontal distance between the water surface monitoring platform and the deep-sea vehicle according to the eigenray and the depth of the deep-sea vehicle by using the Pythagorean theorem.

Step 109 specifically includes:

preliminarily estimating an azimuth angle of the water surface monitoring platform relative to the deep-sea vehicle according to a track of the deep-sea vehicle and a track of the water surface monitoring platform in a preceding period of time; and determining the precise azimuth angle of the water surface monitoring platform relative to the deep-sea vehicle according to the communication signal received by the deep-sea vehicle and the azimuth angle.

Step 110 specifically includes:

adopting a ray theory model and using the azimuth angle and the transmission delay as an angle of emergence and transmission time of the eigenray respectively;

using depth information measured by a high-precision depth gauge in the deep-sea vehicle and a depth of an acoustic transducer of the water surface monitoring platform as an emergence depth and an end point depth of the eigenray respectively;

reconstructing an eigenray according to the angle of emergence, the transmission time, the emergence depth, and the end point depth of the eigenray; and solving the eigenray to obtain the position of the deep-sea vehicle relative to the water surface monitoring platform.

Step 113 specifically includes:

conducting fusion correction on the latitude and longitude information, the horizontal distance, the absolute position information, the inertial navigation information, and the Doppler log information by using a Kalman filtering method, to obtain integrated navigation information.

Before step 113, the method further includes:

conducting determining on the horizontal distance information and the absolute position information according to the track of the deep-sea vehicle and the track of the water surface monitoring platform in the preceding period of time, to determine whether the horizontal distance information and the absolute position information are outlier information; and if yes, deleting the horizontal distance information and the absolute position information; or if no, correcting the horizontal distance information and the absolute position information to obtain the integrated navigation information.

Step 119 specifically includes:

calculating the time difference $\Delta t = (\Delta t_1 - \Delta t_2)/2$ between the water surface monitoring platform and the deep-sea vehicle according to the following formula $\Delta t$, where $\Delta t_1$ is the first time interval, $\Delta t_2$ is the second time interval, and $\Delta t$ is the time difference between the water surface monitoring platform and the deep-sea vehicle.

The deep-sea vehicle measures a whole sound velocity profile by using a sound velocimeter which the deep-sea vehicle carries; to compensate for the influence of sunshine, wind waves, and the like on a surface sound velocity, the water surface monitoring platform measures the sound velocity profile of the sea surface within 200 m at intervals of a period of time, such as one hour, and sends a result to the deep-sea vehicle in a digital underwater acoustic communication manner, and the deep-sea vehicle fuses the sound velocity profile measured during the dive and the newly received surface sound velocity profile to obtain a new sound velocity profile that is used for eigenray solving.

The integrated method for communication, positioning, navigation, and timing of a deep-sea vehicle can fundamentally resolve problems such as insufficient practicability of underwater acoustic communication, low accuracy of navigation and positioning, and no timing function, so as to improve positioning accuracy and information update frequency of a deep-sea vehicle.

Figure 2:
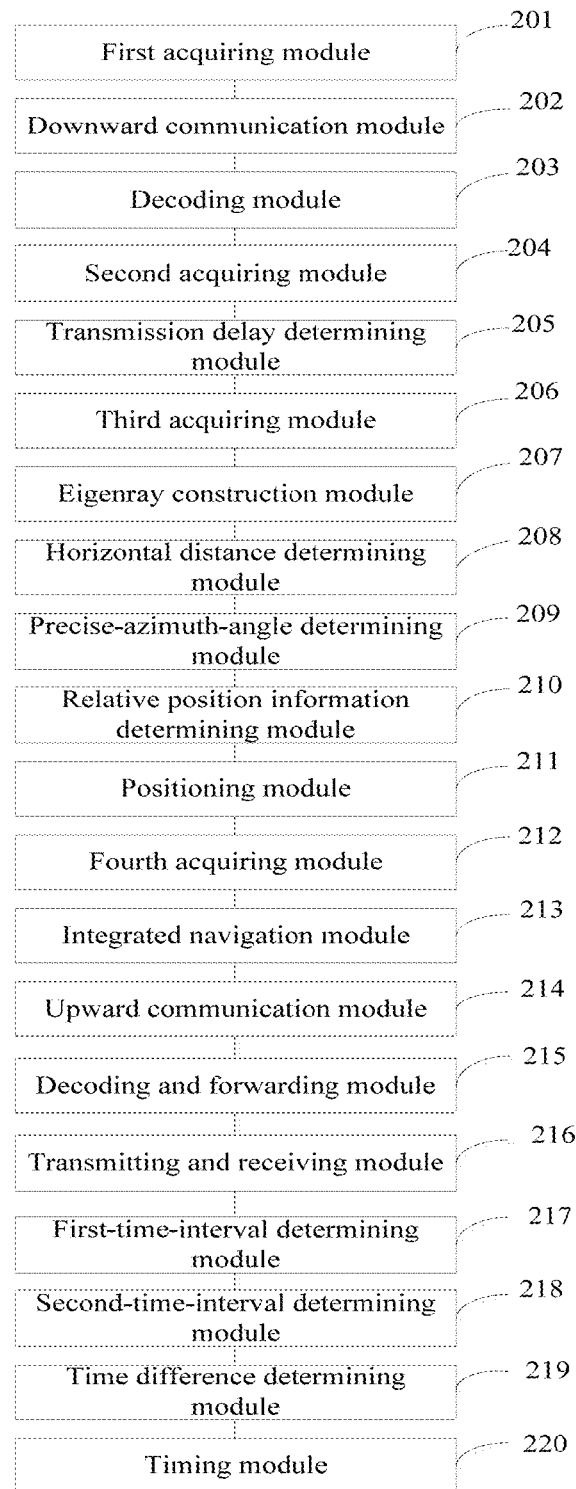
FIG. 2 is a structural diagram of an integrated system for communication, positioning, navigation, and timing of a deep-sea vehicle according to an embodiment of the present invention.
Figure 3:
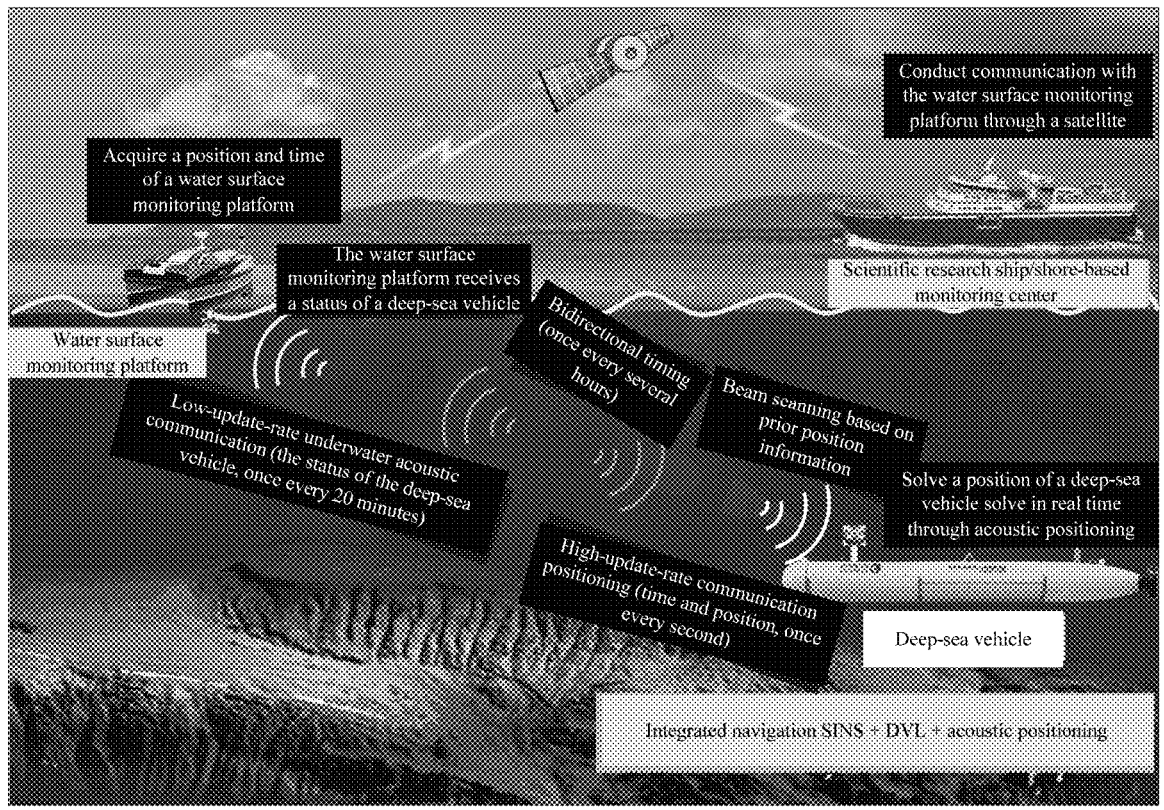
FIG. 3 is a schematic diagram of an integrated working mode of communication, positioning, navigation, and timing of a deep-sea vehicle according to an embodiment of the present invention.

FIG. 2 is a structural diagram of an integrated system for communication, positioning, navigation, and timing of a deep-sea vehicle according to an embodiment of the present invention. FIG. 2 shows an integrated system for communication, positioning, navigation, and timing of a deep-sea vehicle, and the integrated system includes:

a first acquiring module 201, configured to acquire latitude and longitude and time information of a water surface monitoring platform;

a downward communication module 202, configured to deliver the latitude and longitude and time information of the water surface monitoring platform to a deep-sea vehicle in an underwater acoustic communication manner;

a decoding module 203, configured to decode the communication information by the deep-sea vehicle, to acquire the latitude and longitude and a time when the water surface monitoring platform transmits the communication information;

a second acquiring module 204, configured to acquire a time when the deep-sea vehicle receives the communication information;

a transmission delay determining module 205, configured to obtain a transmission delay according to the time when the water surface monitoring platform transmits the communication information and the time when the deep-sea vehicle receives the communication information;

a third acquiring module 206, configured to obtain acquire a sound velocity profile and a depth of the deep-sea vehicle;

an eigenray construction module 207, configured to construct an eigenray according to the sound velocity profile, the depth of the deep-sea vehicle, and the transmission delay;

a horizontal distance determining module 208, configured to obtain a horizontal distance between the water surface monitoring platform and the deep-sea vehicle according to the eigenray and the depth of the deep-sea vehicle;

a precise-azimuth-angle determining module 209, configured to acquire a precise azimuth angle of the water surface monitoring platform relative to the deep-sea vehicle;

a relative position information determining module 210, configured to determine relative position information of the deep-sea vehicle relative to the water surface monitoring platform according to the transmission delay, the azimuth angle, and the depth of the deep-sea vehicle;

a positioning module 211, configured to calculate absolute position information of the deep-sea vehicle according to the relative position information and the latitude and longitude information of the water surface monitoring platform;

a fourth acquiring module 212, configured to acquire inertial navigation information and Doppler log information of the deep-sea vehicle;

an integrated navigation module 213, configured to conduct fusion correction on the latitude and longitude information of the water surface monitoring platform, the horizontal distance, the absolute position information, the inertial navigation information, and the Doppler log information, to obtain integrated navigation information;

an upward communication module 214, configured to send the integrated navigation information, status information, and the like of the deep-sea vehicle to the water surface monitoring platform of the deep-sea vehicle (once every 20 minutes) in an underwater acoustic communication manner;

a decoding and forwarding module 215, configured to decode the communication information by the water surface monitoring platform of the deep-sea vehicle, to obtain the communication information transmitted by the deep-sea vehicle, and forward the communication information to a scientific research ship/shore-based monitoring center through a satellite;

a transmitting and receiving module 216, configured to transmit timing sound pulse signals to each other simultaneously (based on respective clocks) by the water surface monitoring platform and the deep-sea vehicle, and receive the timing sound pulse signal sent by the other party (at an interval of several hours);

a first-time-interval determining module 217, configured to measure a time when the water surface monitoring platform transmits the timing sound pulse signal and a time when the water surface monitoring platform receives the timing sound pulse signal transmitted by the deep-sea vehicle, and record a time difference between the two times as a first time interval;

a second-time-interval determining module 218, configured to measure a time when the deep-sea vehicle transmits the timing sound pulse signal and a time when the deep-sea vehicle receives the timing sound pulse signal transmitted by the water surface monitoring platform, and record a time difference between the two times as a second time interval;

a time difference determining module 219, configured to calculate a time difference between the water surface monitoring platform and the deep-sea vehicle according to the first time interval and the second time interval; and a timing module 220, configured to conduct timing on a clock of the deep-sea vehicle according to the time difference.

The transmission delay determining module 205 specifically includes:

a transmission delay determining unit, configured to determine a transmission delay of an underwater acoustic communication signal according to the time when the water surface monitoring platform transmits the communication information obtained by decoding by the deep-sea vehicle and the time when the deep-sea vehicle receives the communication information.

The horizontal distance determining module 208 specifically includes:

an eigenray construction unit, configured to construct an eigenray according to the sound velocity profile, the depth of the deep-sea vehicle, and the transmission delay;

a horizontal distance determining unit, configured to obtain the horizontal distance between the water surface monitoring platform and the deep-sea vehicle according to the eigenray and the depth of the deep-sea vehicle by using the Pythagorean theorem.

The precise-azimuth-angle determining module 209 specifically includes:

an azimuth angle preliminary determining unit, configured to preliminarily estimate the azimuth angle of the water surface monitoring platform relative to the deep-sea vehicle according to a track of the deep-sea vehicle and a track of the water surface monitoring platform in a preceding period of time;

an azimuth angle precise determining unit, configured to determine the precise azimuth angle of the water surface monitoring platform relative to the deep-sea vehicle according to the communication signal received by the deep-sea vehicle and the azimuth angle.

The relative position information determining module 210 specifically includes:

a first mapping unit, configured to adopt a ray theory model, and use the azimuth angle and the transmission delay as an angle of emergence and transmission time of the eigenray respectively;

a second mapping unit, configured to use depth information measured by a high-precision depth gauge in the deep-sea vehicle and a depth of an acoustic transducer of the water surface monitoring platform as an emergence depth and an end point depth of the eigenray respectively;

a reconstruction unit, configured to reconstruct an eigenray according to the angle of emergence, the transmission time, the emergence depth, and the end point depth of the eigenray; and a solving unit configured to solve the eigenray to obtain the position of the deep-sea vehicle relative to the water surface monitoring platform.

The integrated navigation module 213 specifically includes:

a fusion correction module, configured to conduct fusion correction on the latitude and longitude information, the horizontal distance, the absolute position information, the inertial navigation information, and the Doppler log information by using a Kalman filtering method, to obtain integrated navigation information;

an information determining unit, configured to conduct determining on the horizontal distance information and the absolute position information according to the track of the deep-sea vehicle and the track of the water surface monitoring platform in the preceding period of time, to determine whether the horizontal distance information and the absolute position information are outlier information; and if yes, delete the horizontal distance information and the absolute position information; or if no, correct the horizontal distance information and the absolute position information to obtain the integrated navigation information.

The time difference determining module 219 specifically includes:

a time difference determining unit, configured to calculate the time difference $\Delta t=(\Delta t_1-\Delta t_2)/2$ between the water surface monitoring platform and the deep-sea vehicle according to the following formula $\Delta t$, where $\Delta t_1$ is the first time interval, $\Delta t_2$ is the second time interval, and $\Delta t$ is the time difference between the water surface monitoring platform and the deep-sea vehicle.

The deep-sea vehicle measures a whole sound velocity profile by using a sound velocimeter which the deep-sea vehicle carries; to compensate for the influence of sunshine, wind waves, and the like on a surface sound velocity, the water surface monitoring platform measures the sound velocity profile of the sea surface within 200 m at intervals of a period of time, such as one hour, and sends a result to the deep-sea vehicle in a digital underwater acoustic communication manner, and the deep-sea vehicle fuses the sound velocity profile measured during the dive and the newly received surface sound velocity profile to obtain a new sound velocity profile that is used for eigenray solving.

The water surface monitoring platform and the deep-sea vehicle have different requirements for communication and positioning. The water surface monitoring platform is mainly a scientific research ship, an unmanned ship, a buoy, or the like. For a manned submersible/deep-sea meter-level remotely operated vehicle (ROV), a water surface monitoring platform is generally a scientific research ship; for a deep-sea space station/an autonomous underwater vehicle (AUV), a water surface monitoring platform may be a scientific research ship or an unmanned ship, a buoy; and an unmanned ship or a buoy keeps communication with a scientific research ship through a satellite or radio. The water surface monitoring platform mainly monitors a position and an attitude of the deep-sea vehicle with no need of a relatively high data update rate; during underwater operation, the deep-sea vehicle needs to obtain its own position information in real time at a high update rate. Therefore, it is necessary to ensure that an operating mode of mainly serving a deep-sea vehicle supplemented by a water surface monitoring platform is used in communication/positioning. Therefore, a communication/positioning transducer array is installed on a deep-sea vehicle and integrated with an inertial navigation system into integrated firmware to construct a correction-free acoustic positioning system. The deep-sea vehicle is also provided with a high-precision atomic clock. The water surface monitoring platform is provided with an acoustic communication transducer and a GPS receiver, and is configured to send its GPS position and time information to the deep-sea vehicle in a form of digital communication, for acoustic positioning on the deep-sea vehicle, to solve a position of the deep-sea vehicle in real time at a high update rate with low power consumption. FIG.

3 is a schematic diagram of an integrated working mode of communication, positioning, navigation, and timing of a deep-sea vehicle according to an embodiment of the present invention. In the figure, a deep-sea AUV represents a deep-sea vehicle (for example, a deep-sea space station, a deep-sea manned submersible, a deep-sea remotely operated vehicle, and a deep-sea autonomous vehicle), an unmanned ship represents a water surface monitoring platform (for example, a scientific research ship, an unmanned ship, or a buoy), and a scientific research ship represents a scientific research ship or a shore-based monitoring center.

A specific operating mode is as follows:

In a communication operating mode, the deep-sea vehicle conducts underwater acoustic communication with a water surface monitoring platform at a low update rate, and sends its own status information, for example, once every 20 minutes. The water surface monitoring platform may conduct decoding to obtain the status information of the deep-sea vehicle, for example, a position; and then the water surface monitoring platform sends the status information of the deep-sea vehicle through a satellite to a distant scientific research ship or shore-based monitoring center. When the scientific research ship or shore-based monitoring center needs to send an instruction to the deep-sea vehicle, the scientific research ship or shore-based monitoring center first sends command information to the water surface monitoring platform through a satellite, and then the water surface monitoring platform delivers the command information to the deep-sea vehicle.

A positioning operating mode: (1) The water surface monitoring platform acquires its own position through a satellite, packages its position information, time information, and instruction together, and send them to the deep-sea vehicle at a high update rate, for example, once every second; (2) based on prior position, a beam direction of an acoustic transducer array may be preset, noise of the deep sea vehicle may be suppressed, and an output signal-to-noise ratio may be increased; (3) after receiving the foregoing information, the deep-sea vehicle conducts communication decoding to obtain a position and time when the water surface monitoring platform transmits the information, conducts azimuth estimation, and estimates a transmission delay based on the information transmission time of the water surface monitoring platform, so as to solve its own position. During the whole positioning process, an acoustic signal is unidirectionally transmitted by the water surface monitoring platform to the deep-sea vehicle, that is, the deep-sea vehicle only receives the acoustic signal but does not transmit the acoustic signal, so as to implement real-time, high-update-rate, low-power-consumption, and high-accuracy positioning.

Navigation operating mode: An integrated navigation system composed of SINS+DVL+acoustic positioning implement high-precision and fault-tolerant navigation.

Timing operating mode: The water surface monitoring platform and the deep-sea vehicle send timing signals to each other every few hours by using a sound-field reciprocity principle, a time difference is measured to compensate a time drift error of an atomic clock of the deep-sea vehicle, so as to implement precise underwater timing.

In actual application, four operating functions: communication, positioning, navigation, and timing cross with each other and integrated. Specific operating steps are as follows:

(1) Conduct acoustic positioning at an update rate of once every second.

In a normal situation, a satellite positioning unit of the water surface monitoring platform (in order to reduce coordinate system conversion, a satellite receive antenna is installed directly above an underwater acoustic communication transducer) obtains a position (latitude and longitude) and time (GPS time) of the water surface monitoring platform in real time. To improve the satellite positioning accuracy, differential GPS is generally adopted.

A signal processing unit of the water surface monitoring platform packages the latitude and longitude information, the time information, a common instruction (non-first priority), and the like together, and after decoding, delivers a digital underwater acoustic signal to the deep-sea vehicle through an underwater acoustic communication unit at a high update rate, for example, once every second, where a packet head of the digital underwater acoustic signal is used as a time pulse, and the latitude and longitude information and the time information are mainly used for positioning of the deep-sea vehicle.

An acoustic transducer array of the deep-sea vehicle receives the underwater acoustic signal from the water surface monitoring platform. To improve the quality of the received underwater acoustic signal, an acoustic transducer of the deep-sea vehicle uses an array structure, estimates an orientation of the water surface monitoring platform relative to the deep-sea vehicle according to a position of the deep-sea vehicle and prior information of the water surface monitoring platform position, adjusts a beam direction of the acoustic transducer array according to attitude information of the deep-sea vehicle output by the inertial navigation system of the deep-sea vehicle, make it point to a direction of the water surface monitoring platform, so as to suppress noise (radiation noise of a propeller, a motor, and the like) of the deep-sea vehicle, and increase an output signal-to-noise ratio.

After the acoustic transducer array receives the underwater acoustic signal from the water surface monitoring platform, an underwater acoustic positioning signal processing unit of the deep-sea vehicle uses a packet head of the digital underwater acoustic signal to record a time when a positioning pulse arrives, and also uses packet head of the digital underwater acoustic signal to estimate a target orientation, to accurately estimate the orientation of the water surface monitoring platform relative to the deep-sea vehicle.

In addition, the underwater acoustic communication signal processing unit of the deep-sea vehicle conducts communication decoding on a received signal to obtain a position (latitude and longitude), time (time), and a general instruction when the water surface monitoring platform transmits information.

The underwater acoustic positioning signal processing unit of the deep-sea vehicle estimates a transmission delay of the underwater acoustic signal according to the information transmission time of the water surface monitoring platform and the time when the deep-sea vehicle receives the positioning pulse.

The underwater acoustic positioning signal processing unit of the deep-sea vehicle rapidly calculates an eigenray connecting the water surface monitoring platform and the deep-sea vehicle based on a ray theory model by using a solved azimuth angle (horizontal and pitching angles) and the transmission delay as an angle of emergence and transmission time of the eigenray respectively, accurately calculates the position of the deep-sea vehicle relative to the water surface monitoring platform, and conducts correction by using depth information measured by a high-precision depthometer.

The underwater acoustic positioning signal processing unit of the deep-sea vehicle converts the relative position of the deep-sea vehicle relative to the water surface monitoring platform into absolute latitude and longitude of the deep-sea vehicle based on the latitude and longitude information at the information transmission time of the water surface monitoring platform, so as to solve a position of the deep-sea vehicle. During the whole positioning process, an acoustic signal is unidirectionally transmitted by the water surface monitoring platform to the deep-sea vehicle; the deep-sea vehicle only receives the acoustic signal but does not transmit the acoustic signal, so as to implement real-time, high-update-rate (once every second), low-power-consumption, and high-accuracy positioning.

(2) Correct integrated navigation by using a positioning result at an update rate of once every second.

An integrated navigation information fusion unit of the deep-sea vehicle uses an inertial navigation system (the SINS and an acoustic transducer are integrated, and are calibrated in a laboratory) and an acoustic Doppler log (DVL) as a core, and uses velocity information measured by the DVL to conduct correction on the SINS, where a data update rate of the DVL is 10 Hz.

Each time the underwater acoustic positioning signal processing unit of the deep-sea vehicle completes positioning, the underwater acoustic positioning signal processing unit transmits a positioning result to the integrated navigation information fusion unit of the deep-sea vehicle. The information fusion unit first determines whether the positioning result is an outlier based on prior information. If the positioning result is an outlier, the positioning result is directly deleted; or if the positioning result is not an outlier, the positioning result is used to correct an SINS+DVL navigation result. An update rate of positioning data is 1 Hz.

(3) Conduct underwater acoustic communication every 20 minutes or so.

Every a relatively long time, such as 20 minutes, the underwater acoustic communication signal processing unit of the deep-sea vehicle conducts underwater acoustic communication with the water surface monitoring platform once at a low update rate, to send status information of the deep-sea vehicle, an underwater acoustic communication signal processing unit of the water surface monitoring platform may conduct decoding to obtain the status information of the deep-sea vehicle, for example, a position and an attitude.

A satellite communication unit of the water surface monitoring platform sends the status information of the deep-sea vehicle to a distant scientific research ship or shore-based monitoring center.

After receiving the status information of the deep-sea vehicle, the scientific research ship or shore-based monitoring center can implement monitoring of the deep-sea vehicle, and feeds back an instruction to the water surface monitoring platform as appropriate, and then the underwater acoustic communication signal processing unit of the water surface monitoring platform delivers the instruction to the deep-sea vehicle.

(4) Conduct underwater timing every several hours.

The underwater acoustic communication signal processing unit of the water surface monitoring platform and the underwater acoustic communication signal processing unit of the deep-sea vehicle transmit different encoded acoustic pulse signals to each other at an appointed integral point time (based on respective clocks), and their acoustic transducers each receives an acoustic signal from the other party. Based on the sound-field reciprocal theory, an uplink acoustic signal and a downlink acoustic signal pass through a same path in a short time, and influence of homogeneity of media in an underwater acoustic channel cancels each other.

The water surface monitoring platform accurately measures a time when the water surface monitoring platform receives an acoustic signal sent from the deep-sea vehicle, and compares the time with the integral point time to calculate a time interval; and the deep-sea vehicle accurately measures a time when the deep-sea vehicle receives an acoustic signal sent from the water surface monitoring platform, and compares the time with the integral point time to calculate a time interval.

The underwater acoustic communication signal processing unit of the water surface monitoring platform sends the time interval measured by the water surface monitoring platform to the deep-sea vehicle, and the deep-sea vehicle may solve a time difference between the water surface monitoring platform and the deep-sea vehicle according to the two time intervals.

The water surface monitoring platform adopts global navigation satellite system (GNSS) time, which is absolute time. Therefore, absolute time of the deep-sea vehicle can be obtained by compensating the time difference, so as to implement accurate underwater timing.

The satellite communication unit of the water surface monitoring platform is always in a listening state, and receives an instruction from the scientific research ship or the shore-based monitoring center at any time. One type of instruction is sent to the water surface monitoring platform, and the other type of instruction is sent to the deep-sea vehicle. An instruction sent by the scientific research ship or the shore-based monitoring center to the deep-sea vehicle has a highest priority. Once the water surface monitoring platform receives an instruction to be delivered to the deep-sea vehicle, the water surface monitoring platform temporarily interrupts ongoing positioning and other tasks, and preferentially conducts interactive communication with the deep-sea vehicle. In this case, the signal processing unit of the water surface monitoring platform encodes the received instruction, and sends an encoded instruction out through a digital underwater acoustic communications system; a digital underwater acoustic communications system of the deep-sea vehicle conducts decoding after receiving the encoded instruction, and executes the instruction; and then a signal processing unit of the deep-sea vehicle encodes information such as an execution result or status, and sends encoded information to the water surface monitoring platform through the digital underwater acoustic communications system. In a normal situation, instruction communication occurs rarely, and generally occurs in an emergency situation.

The integrated method for communication, positioning, navigation, and timing of a deep-sea vehicle has the following advantages:

(1) It is convenient for implementing real-time, high-update-rate, low-power-consumption, and high-precision positioning of the deep-sea vehicle.

(2) Field calibration of a separate system is avoided, difficulty of multi-sensor information fusion caused due to non-uniformity of time and space reference is reduced, and precision of integrated navigation is improved.

(3) It is convenient for constructing auxiliary navigation for accurate ranging of the water surface monitoring platform, and avoid integrated navigation anomaly caused due to lack of DVL velocity information during long-term diving/floating/ultra-short-distance seabed operation process of the deep-sea vehicle.

(4) Acoustic timing is introduced to resolve a time reference uniformity problem, a divergence velocity of system positioning precision is delayed, and an underwater working time of a system is prolonged.

(5) The water surface monitoring platform on which the method depends may be an unmanned ship or buoy, and can avoid use of a scientific research ship on a water surface to a greatest extent.

Therefore, the integrated method for communication, positioning, navigation, and timing of a deep-sea vehicle can fundamentally resolve problems such as insufficient practicability of underwater acoustic communication, low accuracy of navigation and positioning, and no timing function, so as to improve positioning accuracy and information update frequency of a deep-sea vehicle.

Figure 4:
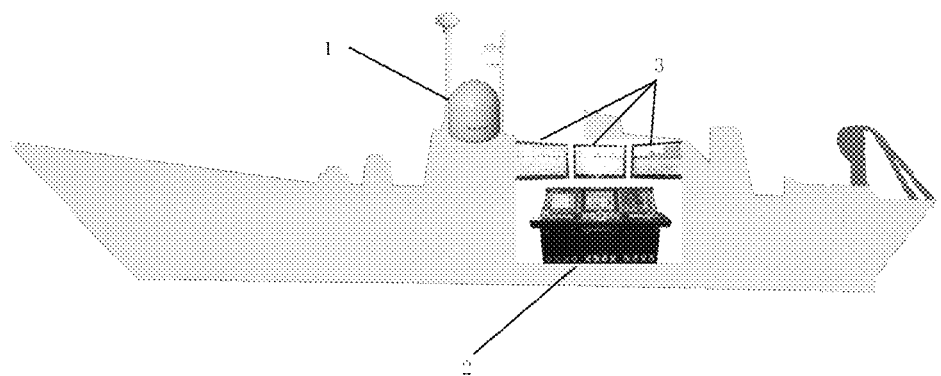
FIG. 4 is a schematic composition diagram of a scientific research ship/shore-based monitoring center according to an embodiment.

An integrated apparatus for communication, positioning, navigation, and timing of a deep-sea vehicle includes the following parts:

1. A scientific research ship/shore-based monitoring center part:

FIG. 4 is a schematic composition diagram of a scientific research ship/shore-based monitoring center according to an embodiment of the present invention. As shown in FIG. 4, the scientific research ship or shore-based monitoring center part mainly includes a satellite communication unit 1, an information processing unit 2, a display 3, and the like. The satellite communication unit 1 is configured to conduct interactive communication with a water surface monitoring platform. In one aspect, the satellite communication unit 1 sends an instruction to the water surface monitoring platform, and the water surface monitoring platform sends the instruction to a deep-sea vehicle. In another aspect, the satellite communication unit 1 receives status information of the deep-sea vehicle sent by the water surface monitoring platform, for example, position information, energy consumption information, attitude information, and alarm information. The information processing unit and the display are mainly configured to intuitively display the position information, the energy consumption information, the attitude information, the alarm information, and the like of the deep-sea vehicle.

The satellite communication unit 1 of the scientific research ship or shore-based monitoring center conducts interactive communication with a satellite communication unit 4 of the water surface monitoring platform through a satellite. The satellite communication unit 1 of the scientific research ship or shore-based monitoring center is connected to the information processing unit 2 of the scientific research ship or shore-based monitoring center, forwards, to the information processing unit 2, the information of the deep-sea vehicle sent from the water surface monitoring platform, and receives an instruction from the information processing unit 2.

The information processing unit 2 of the scientific research ship or shore-based monitoring center is connected to the satellite communication unit 1 of the scientific research ship or shore-based monitoring center, processes status information of the water surface monitoring platform and the deep-sea vehicle sent from the water surface monitoring platform, and sends a manually input instruction to the water surface monitoring platform through the satellite communication unit 1.

The display 3 of the scientific research ship or shore-based monitoring center and the information processing unit 2 of the scientific research ship or shore-based monitoring center are configured to display the status information of the deep-sea vehicle and the water surface monitoring platform.

Figure 5:
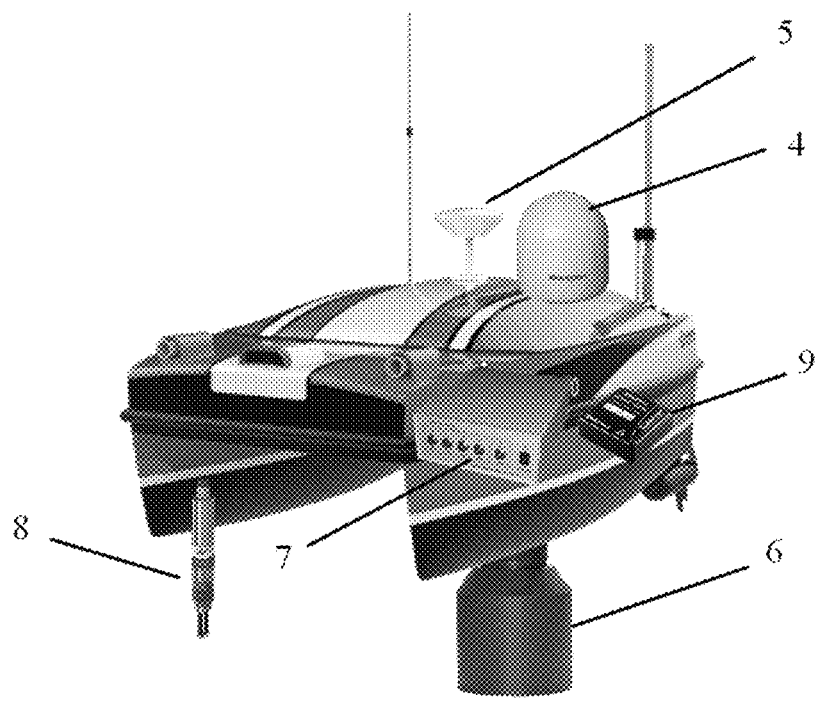
FIG. 5 is a schematic composition diagram of a water surface monitoring platform according to an embodiment.

2. A water surface monitoring platform part:

The water surface monitoring platform is used as an information hinge between the deep-sea vehicle and the scientific research ship or shore-based monitoring center, and main functions of the water surface monitoring platform include sending an acoustic communication positioning signal to the deep-sea vehicle and receiving a communication signal from the deep-sea vehicle; and conducting information interaction with the scientific research ship or shore-based monitoring center through a satellite. FIG. 5 is a schematic composition diagram of a water surface monitoring platform according to an embodiment of the present invention. As shown in FIG. 5, the water surface monitoring platform part mainly includes a satellite communication unit 4, a satellite positioning unit 5, a transmitter-receiver integrated acoustic transducer 6, an underwater acoustic communication signal processing unit 7, a surface velocimeter 8, an atomic clock 9, and the like.

The satellite communication unit 4 of the water surface monitoring platform is connected to the satellite communication unit 1 of the scientific research ship or shore-based monitoring center through a satellite, to conduct interactive communication. The satellite communication unit 4 of the water surface monitoring platform is connected to the underwater acoustic communication signal processing unit 7 of the water surface monitoring platform, and forwards an instruction sent from the scientific research ship or shore-based monitoring center to the underwater acoustic communication signal processing unit 7, or receives status information of the deep-sea vehicle received by the underwater acoustic communication signal processing unit 7. The satellite communication unit 4 of the water surface monitoring platform is connected to the atomic clock 9 of the water surface monitoring platform, and provides time correction for the atomic clock 9.

The satellite positioning unit 5 of the water surface monitoring platform is connected to the underwater acoustic communication signal processing unit 7 of the water surface monitoring platform, and provides information such as latitude and longitude and time of the water surface monitoring platform for the underwater acoustic communication signal processing unit 7.

The transmitter-receiver integrated acoustic transducer 6 of the water surface monitoring platform is connected to the underwater acoustic communication signal processing unit 7 of the water surface monitoring platform, and delivers information from the underwater acoustic communication signal processing unit 7 to the deep-sea vehicle or receives information sent from the deep-sea vehicle.

The surface velocimeter 8 is connected to the underwater acoustic communication signal processing unit 7 of the water surface monitoring platform, and is used to provide surface layer sound velocity profile information.

The atomic clock 9 of the water surface monitoring platform is connected to the underwater acoustic communication signal processing unit 7 of the water surface monitoring platform, and is configured to provide a time reference. The atomic clock 9 of the water surface monitoring platform and the satellite positioning unit 5 of the water surface monitoring platform are configured to correct a time drift of the atomic clock in real time.

Figure 6:
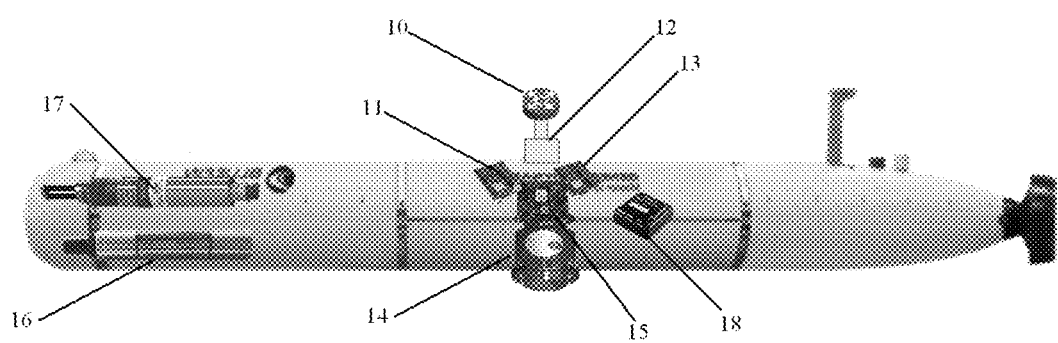
FIG. 6 is a schematic composition diagram of a deep-sea vehicle according to an embodiment.

3. A deep-sea vehicle part:

In the integrated system for communication, positioning, navigation, and timing of a deep-sea vehicle, communication, positioning, navigation, and timing mainly serves the deep-sea vehicle supplemented by the water surface monitoring platform and the scientific research ship or shore-based monitoring center. FIG. 6 is a schematic composition diagram of a deep-sea vehicle according to an embodiment of the present invention. As shown in FIG. 6, the deep-sea vehicle part mainly includes an acoustic transducer array 10, an underwater acoustic communication signal processing unit 11, an inertial navigation unit 12, an underwater acoustic positioning signal processing unit 13, an acoustic Doppler log 14, an integrated navigation information fusion unit 15, a depthometer 16, a sound velocimeter 17, an atomic clock 18, and the like.

The acoustic transducer array 10 of the deep-sea vehicle includes a plurality of receiving hydrophones, filter amplifiers, and beam formers, one transmitting transducer, a power amplifier, and the like. The acoustic transducer array 10 is connected to the underwater acoustic communication signal processing unit 11, and is configured to conduct communication decoding with the water surface monitoring platform. The acoustic transducer array 10 is connected to the underwater acoustic positioning signal processing unit 13 of the deep-sea vehicle are connected, and the underwater acoustic positioning signal processing unit 13 is configured to record a time when an underwater acoustic signal arrives, and complete target orientation estimation. The acoustic transducer array 10 and the inertial navigation unit 12 of the deep-sea vehicle are connected and integrated, and are calibrated in a laboratory, to avoid burdensome calibration on the sea.

The underwater acoustic communication signal processing unit 11 of the deep-sea vehicle is connected to the acoustic transducer array 10 of the deep-sea vehicle, and is configured to receive an underwater acoustic signal from the water surface monitoring platform or send status information of the deep-sea vehicle to the water surface monitoring platform. The underwater acoustic communication signal processing unit 11 is connected to the underwater acoustic positioning signal processing unit 13, and is configured to forward, to the underwater acoustic communication signal processing unit, decoded information sent from the water surface monitoring platform such as latitude and longitude, time, and a time interval, for position solving or timing. The underwater acoustic communication signal processing unit 11 is connected to the integrated navigation information fusion unit 15, and provides latitude and longitude and attitude information of the deep-sea vehicle. The underwater acoustic communication signal processing unit 11 is connected to the atomic clock, and uses the atomic clock 18 to provide a time reference.

The underwater acoustic positioning signal processing unit 13 of the deep-sea vehicle is connected to the acoustic transducer array 10 of the deep-sea vehicle, and is configured to receive an underwater acoustic signal from the water surface monitoring platform. The underwater acoustic positioning signal processing unit 13 is connected to the underwater acoustic communication signal processing unit 11, and is configured to receive information sent from the water surface monitoring platform. The underwater acoustic positioning signal processing unit 13 is connected to the inertial navigation unit 12 of the deep-sea vehicle, and provides attitude information of the acoustic transducer array 10 of the deep-sea vehicle. The underwater acoustic positioning signal processing unit 13 is connected to the integrated navigation information fusion unit 15 of the deep-sea vehicle, sends a positioning result to the integrated navigation information fusion unit 15, corrects an integrated navigation error, and receives position data of the deep-sea vehicle provided by the integrated navigation information fusion unit 15, where the position data and information such as attitude information and a position of the water surface monitoring platform in a previous time are used as prior information. The underwater acoustic positioning signal processing unit 13 adjusts a beam direction of the acoustic transducer array 10, to make the beam direction point to a direction of the water surface monitoring platform, so as to suppress noise (radiation noise of a propeller, a motor, and the like) of the deep-sea vehicle, and increase an output signal-to-noise ratio. The underwater acoustic positioning signal processing unit 13 is connected to the atomic clock 18 of the deep-sea vehicle, and uses the atomic clock 18 to provide a time reference.

The inertial navigation unit 12 of the deep-sea vehicle and the acoustic transducer array 10 of the deep-sea vehicle are connected and form integrated firmware, and are calibrated in a laboratory. The inertial navigation unit 12 is connected to the underwater acoustic positioning signal processing unit 13 of the deep-sea vehicle, and provides, for the underwater acoustic positioning signal processing unit 13, attitude information required for positioning. The inertial navigation unit 12 is connected to the integrated navigation information fusion unit 15 of the deep-sea vehicle, and is used as a basis of integrated navigation.

The acoustic Doppler log 14 of the deep-sea vehicle is connected to the integrated navigation information fusion unit 15 of the deep-sea vehicle, and provides velocity correction for the integrated navigation information fusion unit 15. The acoustic Doppler log 14 is connected to the atomic clock 18 of the deep-sea vehicle, and the atomic clock 18 provides a time reference.

The integrated navigation information fusion unit 15 of the deep-sea vehicle is connected to the underwater acoustic communication signal processing unit 11 of the deep-sea vehicle, and provides latitude and longitude and attitude information of the deep-sea vehicle for the underwater acoustic communication signal processing unit 11. The integrated navigation information fusion unit 15 is connected to the underwater acoustic positioning signal processing unit 13 of the deep-sea vehicle, and receives acoustic positioning information provided by the underwater acoustic positioning signal processing unit 13, for integrated navigation. The integrated navigation information fusion unit 15 is connected to the inertial navigation unit 12 of the deep-sea vehicle, and the inertial navigation unit 12 provides a basis for integrated navigation. The integrated navigation information fusion unit 15 is connected to the acoustic Doppler log 14 of the deep-sea vehicle, and the acoustic Doppler log 14 provides velocity correction. The integrated navigation information fusion unit 15 is connected to the atomic clock 18 of the deep-sea vehicle, and the atomic clock 18 provides a time reference.

The depthometer 16 of the deep-sea vehicle is connected to the underwater acoustic positioning signal processing unit 13 of the deep-sea vehicle, and provides depth information for the underwater acoustic positioning signal processing unit 13. The depthometer 16 is connected to the integrated navigation information fusion unit 15 of the deep-sea vehicle, and provides depth information for the integrated navigation information fusion unit 15. The depthometer 16 is connected to the atomic clock 18 of the deep-sea vehicle, and the atomic clock 18 provides a time reference.

The sound velocimeter 17 of the deep-sea vehicle is connected to the underwater acoustic positioning signal processing unit 13 of the deep-sea vehicle, conducts fusion on surface-layer sound velocity information to generate a new sound velocity profile, and provides sound velocity profile information for the underwater acoustic positioning signal processing unit 13. The sound velocimeter 17 is connected to the atomic clock 18 of the deep-sea vehicle, and the atomic clock 18 provides a time reference.

The atomic clock 18 of the deep-sea vehicle is connected to various systems of the deep-sea vehicle, and provides a time reference.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. An integrated method for communication, positioning, navigation, and timing of a deep-sea vehicle, wherein the integrated method is applied to an integrated device for communication, positioning, navigation, and timing of a deep-sea vehicle, the integrated device comprises a water surface monitoring platform, a deep-sea vehicle, and a scientific research ship/shore-based monitoring center; and the integrated method comprises the steps of:

acquiring latitude and longitude and time information of the water surface monitoring platform;

delivering the latitude and longitude and time information of the water surface monitoring platform to the deep-sea vehicle in an underwater acoustic communication manner;

decoding the communication information by the deep-sea vehicle, to acquire the latitude and longitude and a time when the water surface monitoring platform transmits the communication information;

acquiring a time when the deep-sea vehicle receives the communication information;

obtaining a transmission delay according to the time when the water surface monitoring platform transmits the communication information and the time when the deep-sea vehicle receives the communication information;

acquiring a sound velocity profile and a depth of the deep-sea vehicle;

constructing an eigenray according to the sound velocity profile, the depth of the deep-sea vehicle, and the transmission delay;

obtaining a horizontal distance between the water surface monitoring platform and the deep-sea vehicle according to the eigenray and the depth of the deep-sea vehicle;

acquiring a precise azimuth angle of the water surface monitoring platform relative to the deep-sea vehicle;

determining relative position information of the deep-sea vehicle relative to the water surface monitoring platform according to the transmission delay, the azimuth angle, and the depth of the deep-sea vehicle;

calculating absolute position information of the deep-sea vehicle according to the relative position information and the latitude and longitude information of the water surface monitoring platform;

acquiring inertial navigation information and Doppler log information of the deep-sea vehicle;

conducting fusion correction on the latitude and longitude information of the water surface monitoring platform, the horizontal distance, the absolute position information, the inertial navigation information, and the Doppler log information, to obtain integrated navigation information;

sending the integrated navigation information, status information, and the like of the deep-sea vehicle to the water surface monitoring platform of the deep-sea vehicle in an underwater acoustic communication manner;

decoding the communication information by the water surface monitoring platform of the deep-sea vehicle, to obtain the communication information transmitted by the deep-sea vehicle, and forwarding the communication information to the scientific research ship/shore-based monitoring center through a satellite;

transmitting timing sound pulse signals to each other simultaneously by the water surface monitoring platform and the deep-sea vehicle, and receiving the timing sound pulse signal sent by the other party;

measuring a time when the water surface monitoring platform transmits the timing sound pulse signal and a time when the water surface monitoring platform receives the timing sound pulse signal transmitted by the deep-sea vehicle, and recording a time difference between the two times as a first time interval;

measuring a time when the deep-sea vehicle transmits the timing sound pulse signal and a time when the deep-sea vehicle receives the timing sound pulse signal transmitted by the water surface monitoring platform, and recording a time difference between the two times as a second time interval;

calculating a time difference between the water surface monitoring platform and the deep-sea vehicle according to the first time interval and the second time interval; and conducting timing on a clock of the deep-sea vehicle according to the time difference.

2. The integrated method for communication, positioning, navigation, and timing of a deep-sea vehicle according to claim 1, where the obtaining a transmission delay according to the time when the water surface monitoring platform transmits the communication information and the time when the deep-sea vehicle receives the communication information specifically comprises:

determining a transmission delay of an underwater acoustic communication signal according to the time when the water surface monitoring platform transmits the communication information obtained by decoding by the deep-sea vehicle and the time when the deep-sea vehicle receives the communication information.

3. The integrated method for communication, positioning, navigation, and timing of a deep-sea vehicle according to claim 1, where the obtaining a horizontal distance between the water surface monitoring platform and the deep-sea vehicle according to the eigenray and the depth of the deep-sea vehicle specifically comprises the steps of:

constructing the eigenray according to the sound velocity profile, the depth of the deep-sea vehicle, and the transmission delay; and obtaining the horizontal distance between the water surface monitoring platform and the deep-sea vehicle according to the eigenray and the depth of the deep-sea vehicle by using the Pythagorean theorem.

4. The integrated method for communication, positioning, navigation, and timing of a deep-sea vehicle according to claim 1, where the acquiring a precise azimuth angle of the water surface monitoring platform relative to the deep-sea vehicle specifically comprises the steps of:
preliminarily estimating the azimuth angle of the water surface monitoring platform relative to the deep-sea vehicle according to a track of the deep-sea vehicle and a track of the water surface monitoring platform in a preceding period of time;
determining the precise azimuth angle of the water surface monitoring platform relative to the deep-sea vehicle according to the communication signal received by the deep-sea vehicle and the azimuth angle.

5. The integrated method for communication, positioning, navigation, and timing of a deep-sea vehicle according to claim 1, where the determining relative position information of the deep-sea vehicle relative to the water surface monitoring platform according to the transmission delay, the azimuth angle, and the depth of the deep-sea vehicle specifically comprises the steps of:
adopting a ray theory model, and using the azimuth angle and the transmission delay as an angle of emergence and transmission time of the eigenray respectively;
using depth information measured by a high-precision depth gauge in the deep-sea vehicle and a depth of an acoustic transducer of the water surface monitoring platform as an emergence depth and an end point depth of the eigenray respectively;
reconstructing an eigenray according to the angle of emergence, the transmission time, the emergence depth, and the end point depth of the eigenray; and
solving the eigenray to obtain the position of the deep-sea vehicle relative to the water surface monitoring platform.

6. The integrated method for communication, positioning, navigation, and timing of a deep-sea vehicle according to claim 1, where the conducting fusion correction on the latitude and longitude information of the water surface monitoring platform, the horizontal distance, the absolute position information, the inertial navigation information, and the Doppler log information, to obtain integrated navigation information specifically comprises:
conducting fusion correction on the latitude and longitude information, the horizontal distance, the absolute position information, the inertial navigation information, and the Doppler log information by using a Kalman filtering method, to obtain integrated navigation information.

7. The integrated method for communication, positioning, navigation, and timing of a deep-sea vehicle according to claim 1, where, before conducting integrated navigation, the method further comprises:
conducting determining on the horizontal distance information and the absolute position information according to the track of the deep-sea vehicle and the track of the water surface monitoring platform in the preceding period of time, to determine whether the horizontal distance information and the absolute position information are outlier information; and
if yes, deleting the horizontal distance information and the absolute position information; or
if no, correcting the horizontal distance information and the absolute position information to obtain the integrated navigation information.

8. The integrated method for communication, positioning, navigation, and timing of a deep-sea vehicle according to claim 1, where, based on the sound-field reciprocal theory, an uplink acoustic signal and a downlink acoustic signal pass through a same path in a short time, and influence of homogeneity of media in an underwater acoustic channel cancels each other, and the calculating a time difference between the water surface monitoring platform and the deep-sea vehicle according to the first time interval and the second time interval specifically comprises:
calculating the time difference $\Delta t$ between the water surface monitoring platform and the deep-sea vehicle according to the following formula $\Delta t=(\Delta t_1-\Delta t_2)/2$, wherein
$\Delta t_1$ is the first time interval, $\Delta t_2$ is the second time interval, and $\Delta t$ is the time difference between the water surface monitoring platform and the deep-sea vehicle.

9. An integrated system for communication, positioning, navigation, and timing of a deep-sea vehicle, wherein the system comprises:
a first acquiring module, configured to acquire latitude and longitude and time information of a water surface monitoring platform;
a downward communication module, configured to deliver the latitude and longitude and time information of the water surface monitoring platform to a deep-sea vehicle in an underwater acoustic communication manner;
a decoding module, configured to decode the communication information by the deep-sea vehicle, to acquire the latitude and longitude and a time when the water surface monitoring platform transmits the communication information;
a second acquiring module, configured to acquire a time when the deep-sea vehicle receives the communication information;
a transmission delay determining module, configured to obtain a transmission delay according to the time when the water surface monitoring platform transmits the communication information and the time when the deep-sea vehicle receives the communication information;
a third acquiring module, configured to obtain acquire a sound velocity profile and a depth of the deep-sea vehicle;
an eigenray construction module, configured to construct an eigenray according to the sound velocity profile, the depth of the deep-sea vehicle, and the transmission delay;
a horizontal distance determining module, configured to obtain a horizontal distance between the water surface monitoring platform and the deep-sea vehicle according to the eigenray and the depth of the deep-sea vehicle;
a precise-azimuth-angle determining module, configured to acquire a precise azimuth angle of the water surface monitoring platform relative to the deep-sea vehicle;
a relative position information determining module, configured to determine relative position information of the deep-sea vehicle relative to the water surface monitoring platform according to the transmission delay, the azimuth angle, and the depth of the deep-sea vehicle;
a positioning module, configured to calculate absolute position information of the deep-sea vehicle according to the relative position information and the latitude and longitude information of the water surface monitoring platform;

a fourth acquiring module, configured to acquire inertial navigation information and Doppler log information of the deep-sea vehicle;

an integrated navigation module, configured to conduct fusion correction on the latitude and longitude information of the water surface monitoring platform, the horizontal distance, the absolute position information, the inertial navigation information, and the Doppler log information, to obtain integrated navigation information;

an upward communication module, configured to send the integrated navigation information, status information, and the like of the deep-sea vehicle to the water surface monitoring platform of the deep-sea vehicle in an underwater acoustic communication manner;

a decoding and forwarding module, configured to decode the communication information by the water surface monitoring platform of the deep-sea vehicle, to obtain the communication information transmitted by the deep-sea vehicle, and forward the communication information to a scientific research ship/shore-based monitoring center through a satellite;

a transmitting and receiving module, configured to transmit timing sound pulse signals to each other simultaneously by the water surface monitoring platform and the deep-sea vehicle, and receive the timing sound pulse signal sent by the other party;

a first-time-interval determining module, configured to measure a time when the water surface monitoring platform transmits the timing sound pulse signal and a time when the water surface monitoring platform receives the timing sound pulse signal transmitted by the deep-sea vehicle, and record a time difference between the two times as a first time interval;

a second-time-interval determining module, configured to measure a time when the deep-sea vehicle transmits the timing sound pulse signal and a time when the deep-sea vehicle receives the timing sound pulse signal transmitted by the water surface monitoring platform, and record a time difference between the two times as a second time interval;

a time difference determining module, configured to calculate a time difference between the water surface monitoring platform and the deep-sea vehicle according to the first time interval and the second time interval; and a timing module, configured to conduct timing on a clock of the deep-sea vehicle according to the time difference.

10. The integrated system for communication, positioning, navigation, and timing of a deep-sea vehicle according to claim 9, where the integrated navigation module specifically comprises:

a fusion correction module, configured to conduct fusion correction on the latitude and longitude information, the horizontal distance, the absolute position information, the inertial navigation information, and the Doppler log information by using a Kalman filtering method, to obtain integrated navigation information.

* * * * *